US012044946B2

(12) United States Patent
Abbott et al.

(10) Patent No.: US 12,044,946 B2
(45) Date of Patent: Jul. 23, 2024

(54) APPLICATIONS OF AN ELECTROKINETIC DEVICE FOR AN IMAGING SYSTEM

(71) Applicants: James E. Abbott, Albany, OR (US); Timothy Koch, Albany, OR (US); Cassady Roop, Corvallis, OR (US); Palitha Wickramanayake, Corvallis, OR (US)

(72) Inventors: James E. Abbott, Albany, OR (US); Timothy Koch, Albany, OR (US); Cassady Roop, Corvallis, OR (US); Palitha Wickramanayake, Corvallis, OR (US)

(*) Notice: Subject to any disclaimer, the term of this patent is extended or adjusted under 35 U.S.C. 154(b) by 0 days.

(21) Appl. No.: 18/203,041

(22) Filed: May 29, 2023

(65) Prior Publication Data

US 2024/0118581 A1  Apr. 11, 2024

Related U.S. Application Data

(63) Continuation of application No. 17/942,153, filed on Sep. 11, 2022, now Pat. No. 11,693,289, which is a continuation of application No. 16/741,622, filed on Jan. 13, 2020, now Pat. No. 11,454,855.

(60) Provisional application No. 62/793,250, filed on Jan. 16, 2019.

(51) Int. Cl.
*H04N 23/57* (2023.01)
*G02F 1/17* (2019.01)
*H04N 23/55* (2023.01)
*H04M 1/02* (2006.01)

(52) U.S. Cl.
CPC ............ *G02F 1/17* (2013.01); *H04N 23/55* (2023.01); *H04N 23/57* (2023.01); *G02F 2203/11* (2013.01); *H04M 1/0264* (2013.01)

(58) Field of Classification Search
CPC ....... G02F 1/17; G02F 2203/11; H04N 23/55; H04N 23/57; H04M 1/0264
See application file for complete search history.

(56) References Cited

U.S. PATENT DOCUMENTS

| 9,908,115 | B2* | 3/2018 | Hobbs .................. B03C 5/005 |
| 11,170,200 | B2* | 11/2021 | Kim ..................... G06T 1/0014 |
| 2016/0193604 | A1* | 7/2016 | McFarland .......... G02B 27/145 |
| | | | 359/385 |
| 2023/0266636 | A1* | 8/2023 | Koch ...................... G03B 9/08 |
| | | | 396/452 |

* cited by examiner

*Primary Examiner* — Mekonnen D Dagnew
(74) *Attorney, Agent, or Firm* — Olivo IP Law Group, P.C.; John W. Olivo, Jr.

(57) ABSTRACT

An electrokinetic device is configured as a dynamic lens cover and/or filter for an imaging assembly, e.g., of a mobile device, to selectively allow electromagnetic radiation to pass through a lens of the imaging assembly when the dynamic lens cover is in a first operating state or to prevent electromagnetic radiation from reaching the lens of the imaging assembly when the dynamic lens cover is in a second operating state. The electrokinetic device includes transparent first and second substrates, and a compaction trench surrounding the lens of the imaging assembly. The compaction trench stores pigment when the dynamic lens cover is in the first operating state. In the second operating state pigment is dispersed within a carrier fluid between the first and second substrates.

18 Claims, 15 Drawing Sheets

APPLICATIONS OF AN ELECTROKINETIC DEVICE FOR AN IMAGING SYSTEM

PRIORITY CLAIMS

This application is a continuation of and claims priority to U.S. patent application Ser. No. 17/942,153, filed Sep. 11, 2022, which is a continuation of U.S. patent application Ser. No. 16/741,622, filed Jan. 13, 2020, which claims the benefit of U.S. Provisional Application Ser. No. 62/793,250, filed Jan. 16, 2019, all of which are incorporated herein by reference.

FIELD OF THE INVENTION

The present invention relates to an electrokinetic device, and more particularly relates to an electrokinetic (EK) device configured as a dynamic lens cover and/or a dynamic infrared (IR) filter for an imaging system.

BACKGROUND

In a conventional single-lens reflex (SLR) camera, a lens cover is commonly used to protect the lens of the camera from being scratched or damaged. However, lens covers are in most cases not available for miniature cameras integrated with mobile phones, or other electronic devices (e.g., laptops, touchpads, monitors, etc.). Due to the geometric profile of such miniature cameras, there is no simple way to attach a removable lens cover to the lens, and even if a lens cover could be attached, such a lens cover would be easily lost due to its small size. As a result, miniature cameras are typically covered with a permanent and clear protective cover that cannot be removed or "closed." Described herein is a dynamic lens cover for imaging systems, and more generally, applications of an electrokinetic device for imaging systems.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1A:
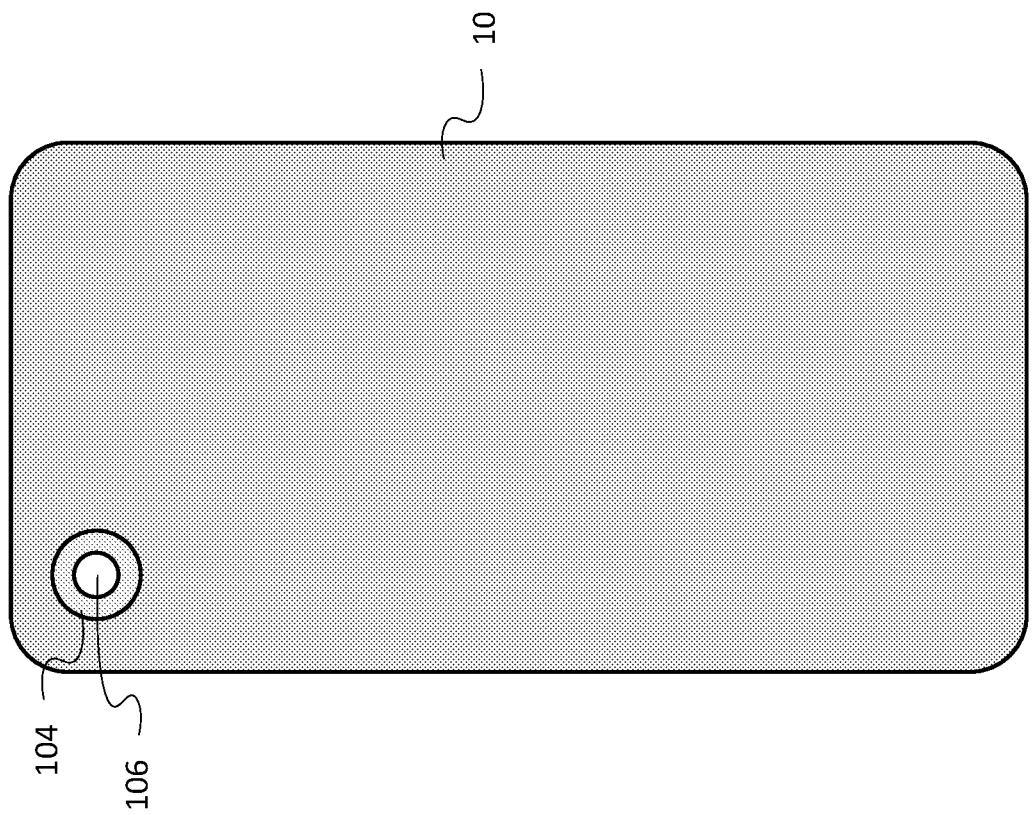
FIG. 1A depicts an electronic device with an imaging assembly (e.g., camera).

FIG. 1A depicts electronic device 10 with an imaging assembly (e.g., camera). In FIG. 1A, electronic device 10 is a mobile device, and more specifically, a mobile phone. However, it is understood that electronic device 10 may also be a laptop, a touchpad, a monitor, a webcam, a security camera, or any other electronic device with an imaging assembly. First substrate 104 (e.g., a glass layer) and lens 102 of the imaging assembly have been labelled in FIG. 1A.

Figure 1B:
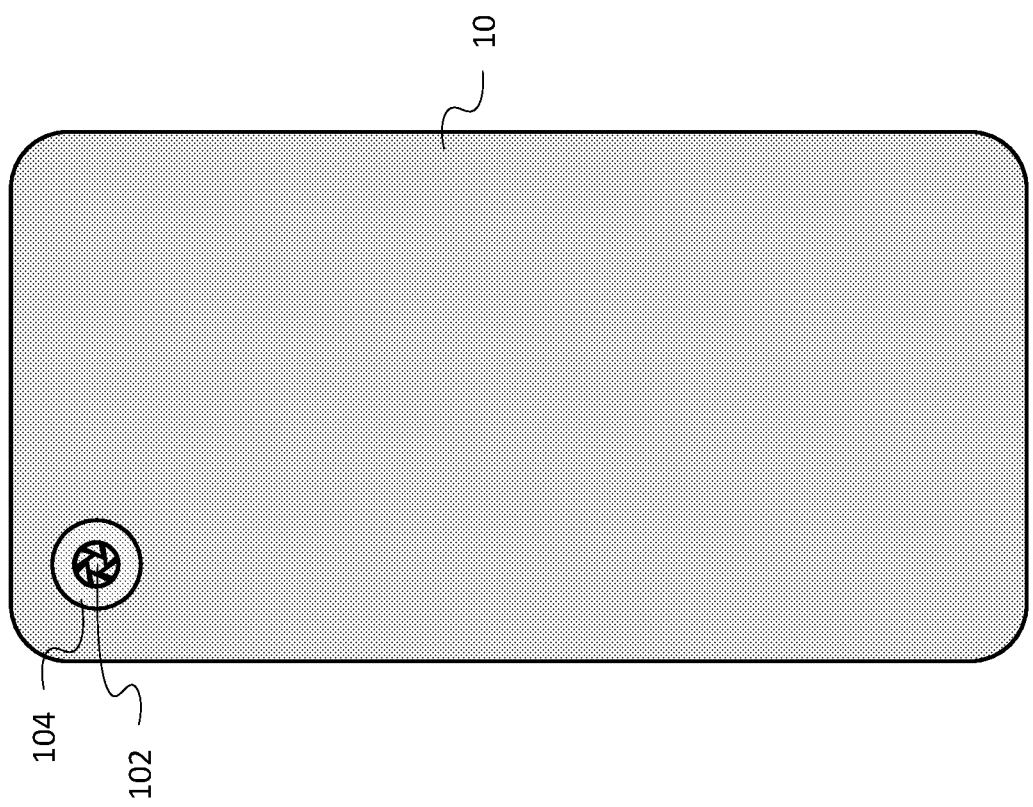
FIG. 1B depicts the imaging assembly of the electronic device of FIG. 1A, in which the lens of the imaging assembly has been covered by a dynamic lens cover, in accordance with one embodiment of the present invention.

FIG. 1B depicts the imaging assembly of the electronic device of FIG. 1A, in which the lens of the imaging assembly has been covered by dynamic lens cover 106 (and thus lens 102 is no longer visible in FIG. 1B). Dynamic lens cover 106 may have two or more operating states. In one embodiment, dynamic lens cover 102 has two operating states: clear and opaque. In the clear state, dynamic lens cover 106 allows electromagnetic radiation to pass through lens 102 of the imaging assembly. In such state, the imaging assembly may capture images of the environment surrounding electronic device 10. In the opaque state (in which dynamic lens cover 102 functions as a lens cover) a layer of pigments (described in more detail in the figures to follow) blocks electromagnetic radiation from reaching lens 102 of the imaging assembly. In such state, the imaging assembly is unable to capture images of the environment surrounding electronic device 10.

Dynamic lens cover 106 may provide several benefits. One, it may provide an added sense of privacy to people in the surrounding environment of electronic device 10. Nowadays, it is difficult for people in the surrounding environment of an electronic device to ascertain whether an imaging device (e.g., camera) of the electronic device is actively recording images, or whether it is merely in an idle state.

With the lens of the imaging device covered up, these people in the surrounding environment of an electronic device can confidently know that they are not being recorded (and/or spied upon). When used to provide an increased sense of privacy, the dynamic lens cover, when operating in its opaque state, is preferably easily visible to a user. For example, if the material surrounding lens 102 appears black (as in FIG. 1B), dynamic lens cover 106 may appear white (or another color other than black) in its opaque state (as in FIG. 1B).

In a surveillance application, dynamic lens cover 106 may camouflage the lens of the imaging assembly (e.g., security camera) when the imaging assembly is not recording images. Often times, a person notices the presence of a security camera (or other camera) by recognizing the appearance of the lens of the security camera. By matching the color of the dynamic lens cover (when in its opaque state) to the color of the surrounding area outside of the lens, the lens of the imaging assembly may be camouflaged, making it less likely for a person to notice the presence of a security camera. Of course, the lens can only be camouflaged when the imaging assembly is not in use, and the lens will still be visible when the camera is in use. However, the ability to camouflage the lens when the camera is not in use still increases the likelihood for the camera to not be noticed by a person.

Dynamic lens cover 106 can also increase the aesthetic appeal of an electronic device. For instance, many users place their mobile phones within phone cases so as to protect the phones in the event that the phones are accidentally dropped. The color of the dynamic lens cover, when operating in the opaque state, can be matched to the color of the phone case, so that the color of the imaging assembly (e.g., camera) more closely matches the color of the phone case. More generally, the color of the dynamic lens cover, when operating in the opaque state, can be matched to the color of an electronic device case that contains an electronic device (such as a smart phone or laptop computer) with an imaging assembly.

As mentioned above, dynamic lens cover 106 may have other operating states, in addition to clear and opaque. In such cases, it may be more appropriate to more generally refer to the dynamic lens cover as an electrokinetic device, as it may provide functions other than a dynamic lens cover. For instance, in a state between a clear and opaque state, the electrokinetic device may function as a dynamic filter (i.e., a filter that can be turned on or off). For example, in a bright outdoor environment, the electrokinetic device may filter out a portion of the visible light to prevent saturation in the captured image.

The electrokinetic device may also dynamically filter specific wavelengths of light, one interesting example being the dynamic filtering of infrared (IR) light. In a conventional mobile phone camera, a static infrared light filter typically is integrated into the camera, preventing IR light from reaching the image sensor of the camera. In many cases, a static IR light filter is desirable, as IR light is not visible to the human eye. However, there may be instances in which the capturing of IR light is desirable, for example, when one seeks to image heat sources (which emit IR light), such as wildlife in the forest at night. To provide such functionality, the static infrared light filter of conventional mobile phone cameras can be replaced with an electrokinetic device which functions as a dynamic IR filter (alone or in addition to a dynamic lens cover). When capturing images in a default mode, the IR filter can be enabled, so that only visible light is captured by the image sensor. When capturing images in an IR-enabled mode, the IR filter can be disabled, allowing IR light (and possibly visible light) to be captured by the image sensor.

The control of the dynamic lens cover/electrokinetic device may be effected in several ways. In an automated control for two modes of operation (i.e., clear and opaque), the dynamic lens cover may be set to the clear state whenever the camera is recording images, and set to the opaque state under all other circumstances. In an automated control for three modes of operation (i.e., IR filter enabled, IR filter disabled and opaque), the electrokinetic device may be set to the IR-filter-enabled mode whenever the camera is recording images under daylight conditions, set to the IR-filter-disabled mode whenever the camera is recording images under night time (or low light) conditions, and set to the opaque mode under all other circumstances.

In a manual control for two modes of operation (i.e., clear and opaque), a user interface may display a radio button (or other user interface element used to select between two states) for the user to enable/disable the dynamic lens cover. In a manual control for three modes of operation (i.e., IR filter enabled, IR filter disabled and opaque), the user interface may display two radio buttons. One radio button may allow the user to enable/disable the dynamic lens cover, and another radio button may allow the user to enable/disable the dynamic IR filter.

Technical constraints for the dynamic lens cover include the requirements to block (e.g., by absorbing, scattering or reflecting) 90% or more of the visible light from reaching the lens of the imaging device in the opaque state, and allow 85% or more of the visible light to reach the lens of the imaging device in the clear state. Further technical constraints include a 100-1000 millisecond switching time from the clear state to the opaque state and similarly a 100-1000 millisecond switching time from the opaque state back to the clear state. Further technical constraints include the ability to block light for lens sizes with a 0.01 to 10 mm diameter. The structure of various embodiments of the dynamic lens cover (and more generally the electrokinetic device) for satisfying these technical constraints are described in the figures and its associated description below.

Figure 2:
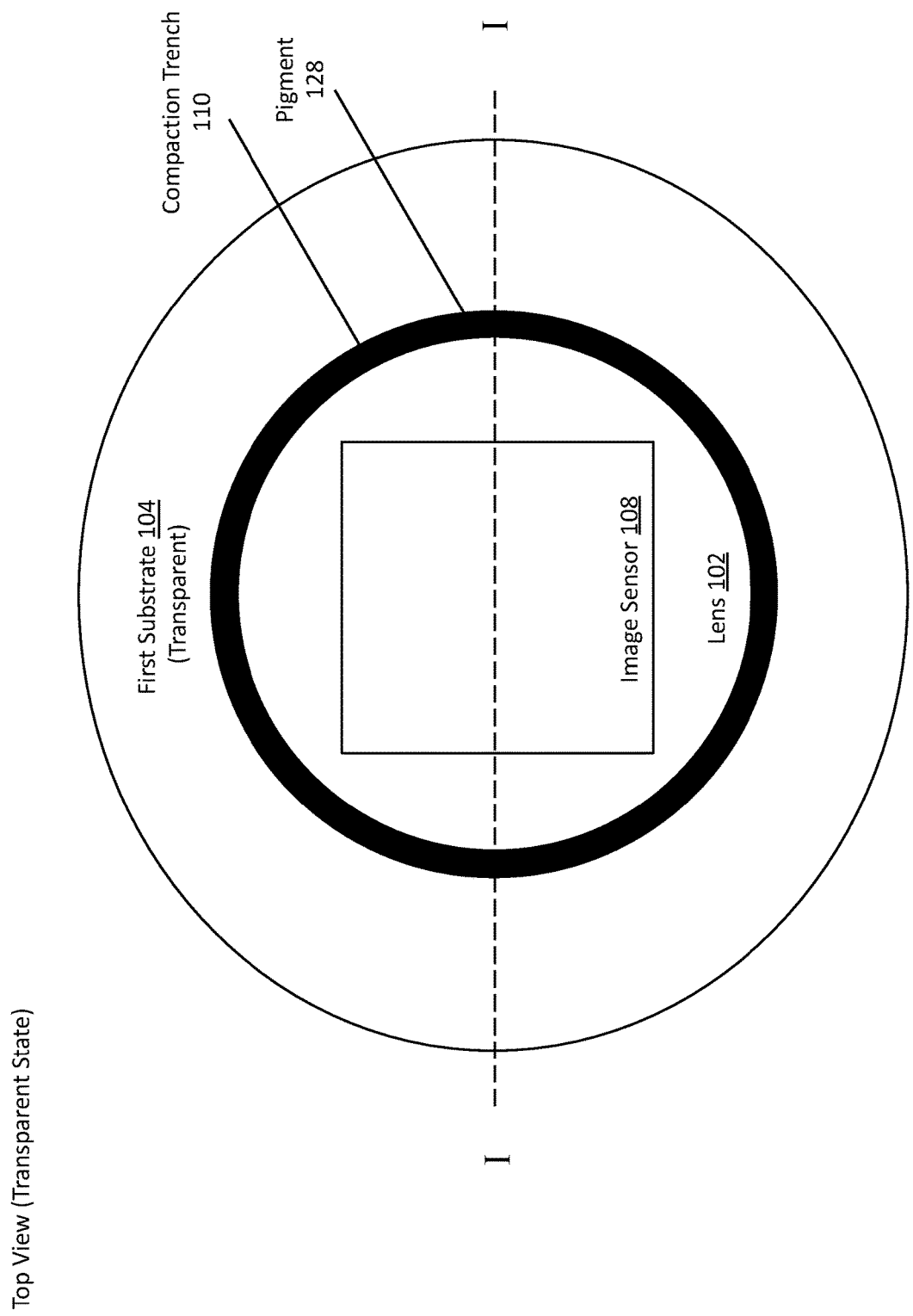
FIG. 2 depicts a top view of a dynamic lens cover (and more generally, an electrokinetic (EK)) device when operating in a "clear state", in accordance with one embodiment of the present invention.

FIG. 2 depicts a top view of an EK device and imaging assembly when the EK device operates in the clear state. The EK device is disposed adjacent to (e.g., on top of) an imaging assembly. The EK device may include first substrate 104 that is transparent, and made out of polyethylene terephthalate (PET), glass, poly(methyl methacrylate) (PMMA) or any non-conductive transparent material. The EK device may also include compaction trench 110 (located behind first substrate 104) and pigment 128 located within compaction trench 110. Compaction trench 110 may surround lens 102 of the imaging assembly in the lateral dimension (i.e., dimension parallel to the page of FIG. 2). Lens 102 may direct electromagnetic radiation towards image sensor 108 of the imaging assembly (i.e., image sensor 108 located behind lens 102). Image sensor 108 may be a charge-coupled device (CCD) sensor, a complementary metal-oxide semiconductor (CMOS), or other sensor capable of converting electromagnetic radiation into electrons.

In the top view of FIG. 2, only certain components of the EK device and the imaging assembly are visible, and additional components are further described below in the side view of FIG. 3. Further, in the top view, compaction trench 110 has the shape of an annulus, the lens has the shape of a circle, and the diameter of the opening of the annular trench is equal to the diameter of the circular lens. However, it is possible, in other embodiments (not depicted) for the diameter of the annular trench to be greater than the diameter of the circular lens or less than the diameter of the circle lens (in which case, pigment 128—when lodged in the annular trench—may form an aperture of lens 102). Further, while an annular trench is the preferred embodiment (as most lenses have a circular outline), trenches with other shapes are possible, including a square trench or an oval-shaped trench (i.e., the shape of the trench referring to the shape of the trench in the top view).

Figure 3:
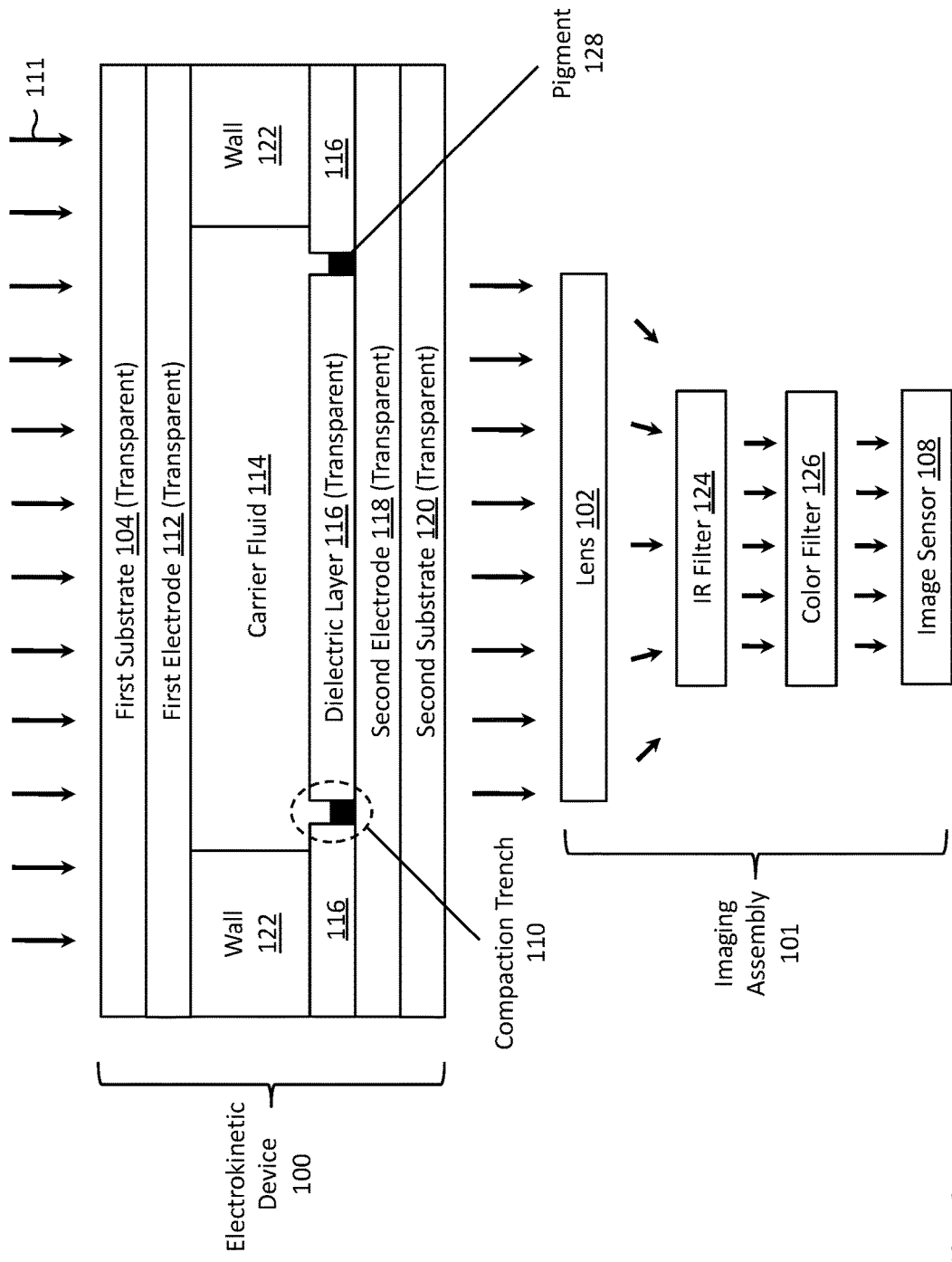
FIG. 3 depicts a cross-sectional view along line I-I of FIG. 2, in accordance with one embodiment of the present invention.

FIG. 3 depicts a cross-sectional view along line I-I of FIG. 2. Electrokinetic device 100 is disposed adjacent to (e.g., on top of) imaging assembly 101. Electrokinetic device 100 may include first substrate 104 and second substrate 120 that are both transparent to electromagnetic radiation. Similar to the first substrate, second substrate 120 may be composed of polyethylene terephthalate (PET), glass, poly(methyl methacrylate) (PMMA) or any non-conductive transparent material. First substrate 104 and second substrate 120 may be planar layers that are parallel to one another.

First electrode 112 (and second electrode 118) may be disposed adjacent to first substrate 104 (and second substrate 120), respectively. First electrode 112 and second electrode 118 may also be transparent to electromagnetic radiation (e.g., constructed from Indium Tin Oxide, Fluorine doped Tin Oxide, etc.). In the embodiment depicted in FIG. 3, both the first and second electrodes are "unpatterned electrodes", meaning that they are fabricated as a planar layer without any subsequent patterning (lithography) step. However, patterned electrodes are possible in other embodiments, as described below.

Dielectric layer 116 may be disposed adjacent to second electrode 118 and may be formed of a transparent organic or inorganic dielectric material. Dielectric layer 116 may be a patterned layer, and may include compaction trench 110 that is formed by patterning a portion of dielectric layer 116.

Wall 122 may be disposed between first substrate 104 and dielectric layer 116 and may form a cavity that is filled with carrier fluid 114. Additional details regarding carrier fluid 114 may be found in U.S. Pat. No. 8,183,757.

In the depicted embodiment, compaction trench 110 is patterned completely through dielectric layer 116 so that second electrode 118 is exposed to carrier fluid 114. However, in another embodiment (not depicted), a compaction trench may be formed in dielectric layer 116 without etching through dielectric layer 116 so that second electrode 118 is not exposed to carrier fluid 114.

Applying a suitable bias across the first electrode 112 and second electrode 118 may cause charged pigments 128 to be attracted towards second electrode 118, and collected in compaction trench 110. In the transparent mode of operation, most of pigments 128 (e.g., more than 99%) are located in compaction trench 110 instead of in the region between dielectric 116 and first electrode 112. In a filtering mode of operation, a first portion of pigments 128 may be located in compaction trench 110 and a second portion of pigments 128 may be located in the region between dielectric 116 and first electrode 112.

Numerous types of pigments may be used in the present invention. Some types of pigments include, but not limited to, carbon and carbon-based pigments, metal, metalloid and non-metal oxides, azo pigments, lake pigments, phthalocyanine pigments, quinacridone pigments, and IR reflective pigments. Examples include, but not limited to: Carbon Black (1333-86-4), TPX 1409 (Cabot Corporation, Billerica, MA), Titanium dioxide (CAS 13463-67-7), Silicon dioxide (CAS 7631-86-9), Pigment Yellow 14 (CAS 5468-75-7), Pigment Yellow 83 (CAS 5567-15-7), Pigment Yellow 17 (CAS 4531-49-1), Pigment Yellow 65 (CAS 6528-34-3), Pigment Yellow 3 (CAS 6486-23-3), Pigment Red 53:1 CAS (5160-02-1), Pigment Red 122 (CAS 980-26-7), Quinacridone (CAS 1047-16-1), Pigment Red 49:1 CAS (1103-38-4), Pigment Red 4 (CAS 2814-77-9), Pigment Blue 29 (CAS 57455-37-5), Pigment Blue 1 (CAS 1325-87-7), and (29H, 31H-phthalocyaninato(2-)-N29,N30,N31,N32) copper (CAS 147-14-8). Specific examples of infrared reflective pigments include PY 182 (CAS 67906-31-4), PY 195, Blue 385 (CAS 1345-16-0), Blue 217, Green 179 (CAS 68187-49-5). Mica-coated pigments are a general class of infrared reflective pigments.

Imaging assembly 101 may include lens 102 that is configured to direct electromagnetic radiation towards image sensor 108. One or more filters may be disposed between lens 102 and image sensor 108 so as to selectively pass electromagnetic radiation to image sensor 108. Color filter 126 may include a two-dimensional array of cells, each cell selectively passing red, green or blue light to image sensor 108. In one embodiment, IR filter 124 may be a static IR filter that (always) blocks IR light from being transmitted to image sensor 108. In another embodiment, IR filter 124 may be a dynamic IR filter that blocks IR light when the dynamic IR filter is enabled and passes IR light when the dynamic IR filter is disabled. The dynamic IR filter may be an electrokinetic device similar to construction as electrokinetic device 100, expect for certain distinctions. For example, compaction trench of the dynamic IR filter may be square or rectangular shaped to match the square or rectangular outline of image sensor 108.

In the transparent mode of operation, electromagnetic radiation 111 is transmitted through electrokinetic device 100 to lens 102, and then selectively transmitted to image sensor 108 from lens 102 based on the operation and/or configuration of IR filter 124 and color filter 126. More specifically, electromagnetic radiation is transmitted in an optical path through electrokinetic device 100. The optical path through electrokinetic device 100 may be formed by at least a portion of first substrate 104, at least a portion of first electrode 112, at least a portion of carrier fluid 114, at least a portion of dielectric layer 116, at least a portion of the second electrode 118 and at least a portion of second substrate 120.

Figure 4:
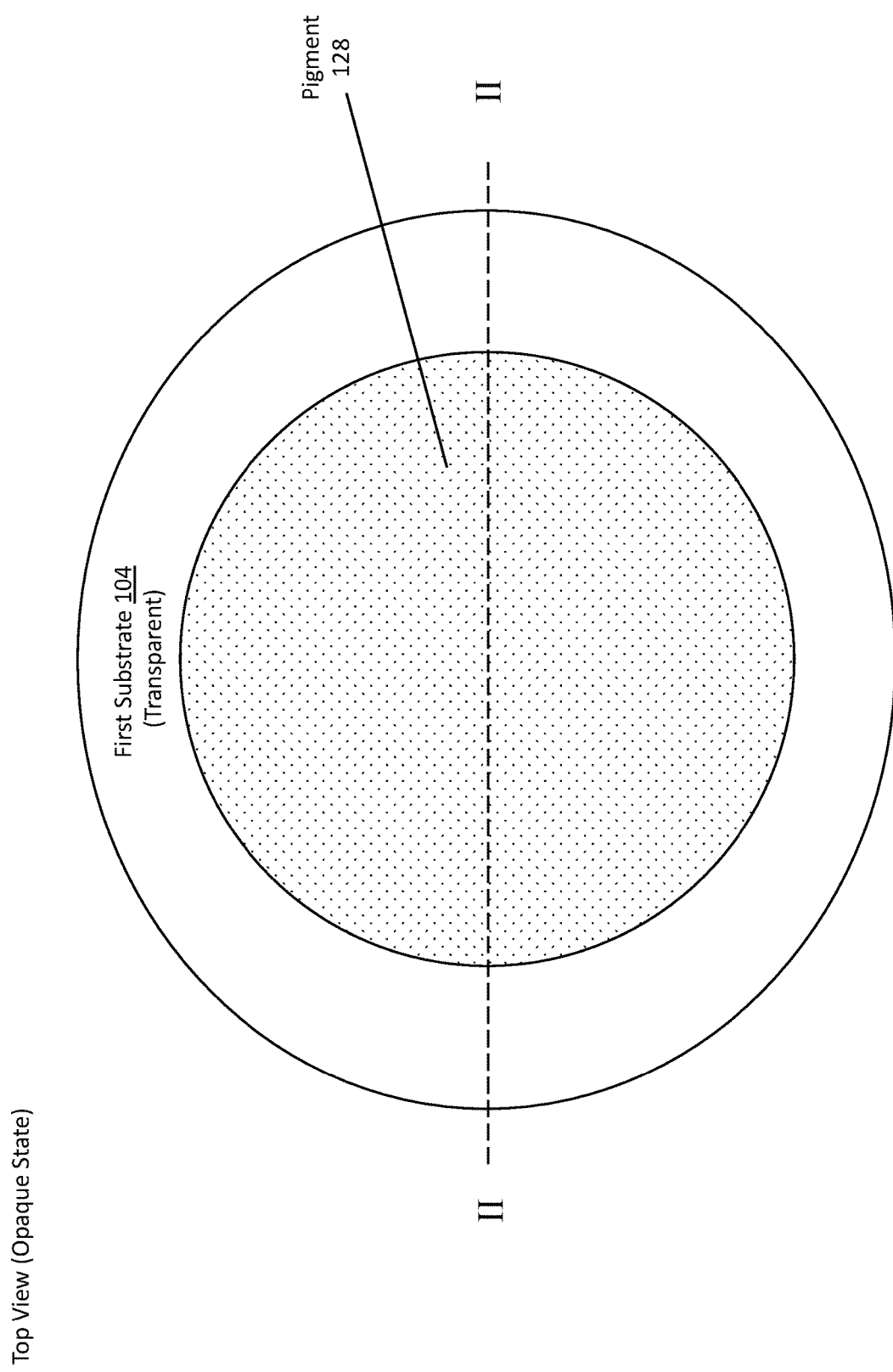
FIG. 4 depicts a top view of the electrokinetic (EK) device when operating in an "opaque state", in accordance with one embodiment of the present invention.

FIG. 4 depicts a top view of an EK device when operating in the opaque state. A portion of first substrate 104 may be visible along with pigment 128 which forms the dynamic lens cover. Pigment 128 may be opaque, preventing lens 102 (and other components following lens 102) from being seen from the top view. In an embodiment (not depicted), carrier fluid may be present under the entire bottom surface first substrate 104, allowing pigment 128 to form an opaque layer under the entire surface of first substrate 104. In contrast, it is noted that in the embodiment depicted in FIG. 4, the opaque layer formed by pigment 128 only is present in a central region under the surface of first substrate 104.

Figure 5:
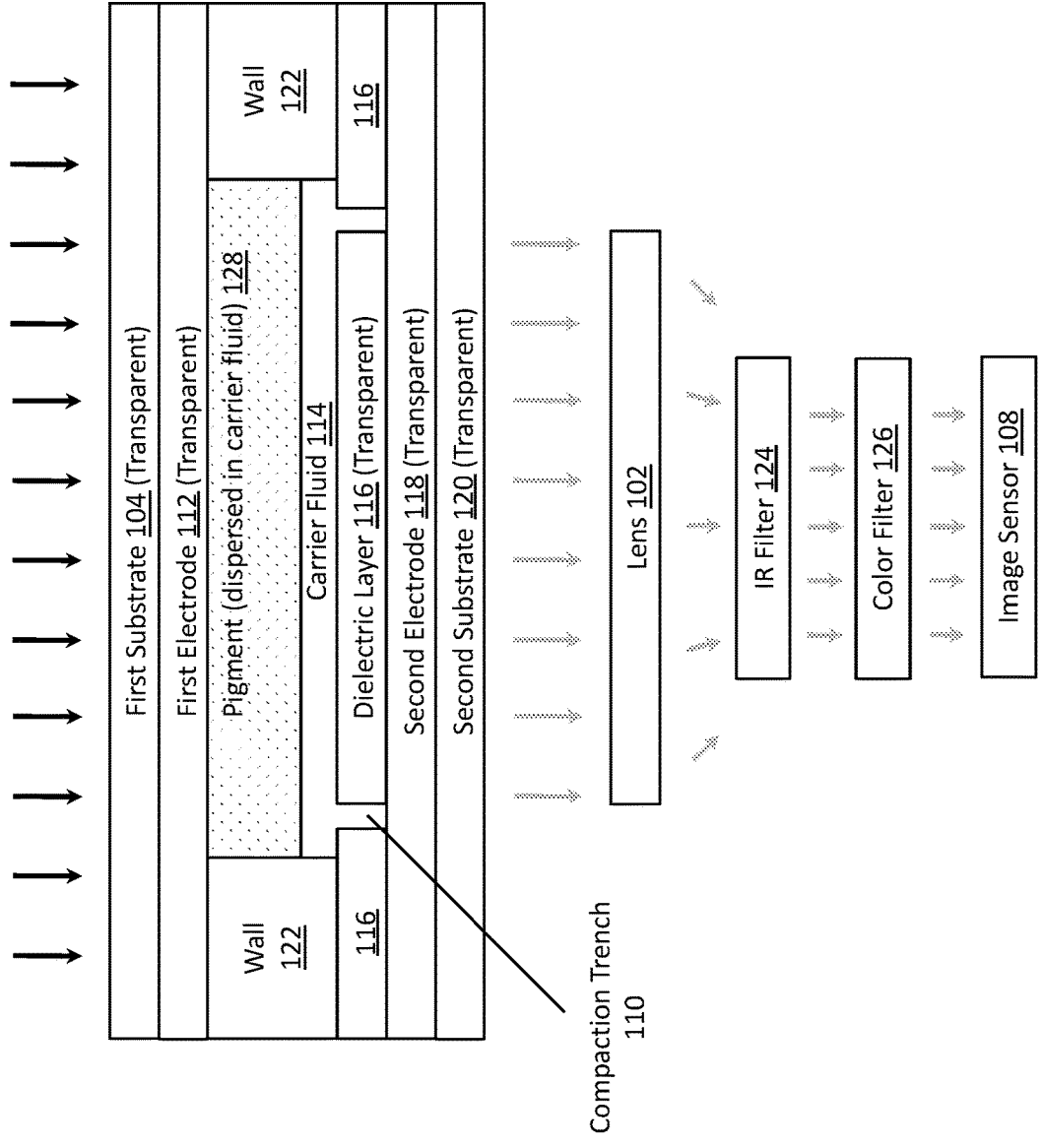
FIG. 5 depicts a cross-sectional view along line II-II of FIG. 4, in accordance with one embodiment of the present invention.

FIG. 5 depicts a cross-sectional view along line II-II of FIG. 4. A bias may be applied across first electrode 112 and second electrode 118 such that pigment 128 is dispersed in carrier fluid 114. Due to the attraction of pigment 128 towards first electrode 112, the pigment may primarily aggregate in a region of carrier fluid 114 proximate to first electrode 112. When configured in the opaque mode of operation, pigment 128 substantially blocks electromagnetic radiation from passing through electrokinetic device 100. In a preferred embodiment, 90% or more of the visible light is blocked from passing through electrokinetic device 100.

However, a small portion of the visible light might still pass through electrokinetic device 100, as illustrated by the gray color arrows which represent weak electromagnetic radiation.

FIGS. 6-9 describe an alternative embodiment of the invention in which EK device 100 serves as both a dynamic lens cover and a dynamic infrared (IR) filter. With this dual functionality, IR filter 124 disposed between lens 102 and image sensor 108 may not be needed (and hence is not depicted in FIGS. 6-9). To enable this dual functionality, two different pigments may be used (labelled as pigment A 128A and pigment B 128B in FIG. 6). Pigment A (128A) may block at least electromagnetic radiation in the visible range, while pigment B (128B) may block only IR radiation. The above-described IR reflective pigments may be used for pigment B.

The use of two pigments that are oppositely charged may allow the two pigments to be separately controlled by patterned second electrode 118A/B. For example, an outer annular portion of second electrode 118A may be used to attract pigments A (128A) in outer compaction trench 110A, and an inner central portion of second electrode 118B may be used to attract pigments B (128B) in inner compaction trench 110B. Further, dielectric ring 117 may be present between portion 118A and portion 118B of the second electrode so as to electrically isolate these regions from one another.

Figure 6:
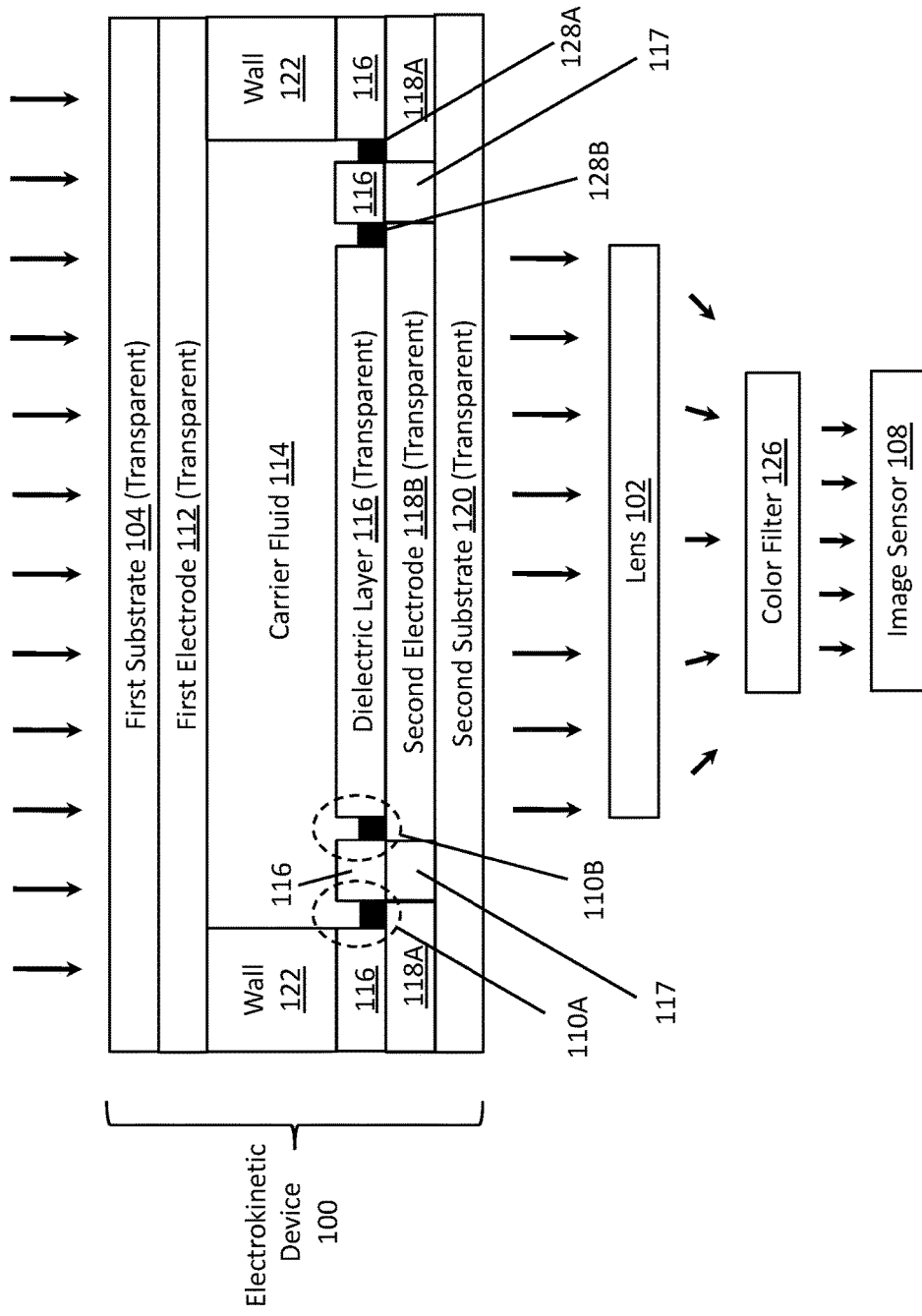
FIGS. 6-9 depict cross-sectional views to illustrate an EK device configured both as a dynamic lens cover and a dynamic infrared (IR) light filter, in accordance with another embodiment of the present invention.

When operating in a completely transparent mode with the IR filter disabled, pigments A and B may be collected in compaction trenches 110A and 110B, respectively, as shown in FIG. 6. Both regions of second electrode 118A/B may be powered (with voltages opposite to one another) to attract the charged pigments in compaction trenches 110A/B.

Figure 7:
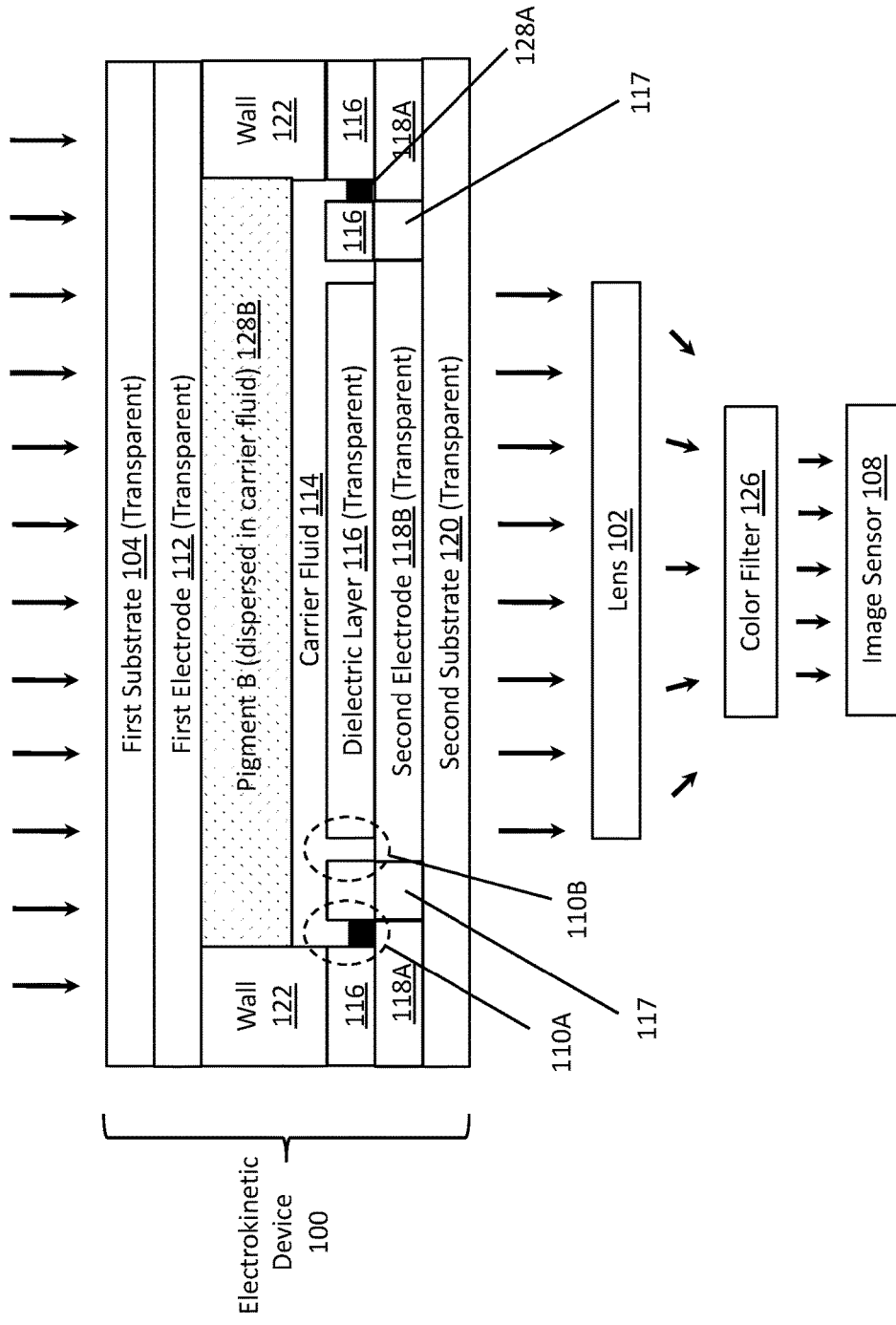

When operating in an IR-filter-enabled mode, pigment A may be collected in compaction trench 110A, while pigment B may be dispersed in carrier fluid 114 so as to block the transmission of IR radiation, as shown in FIG. 7. Outer portion 118A of the second electrode may be powered to attract pigment A in compaction trench 110A, while the inner portion 118B of the second electrode may be grounded.

Figure 8:
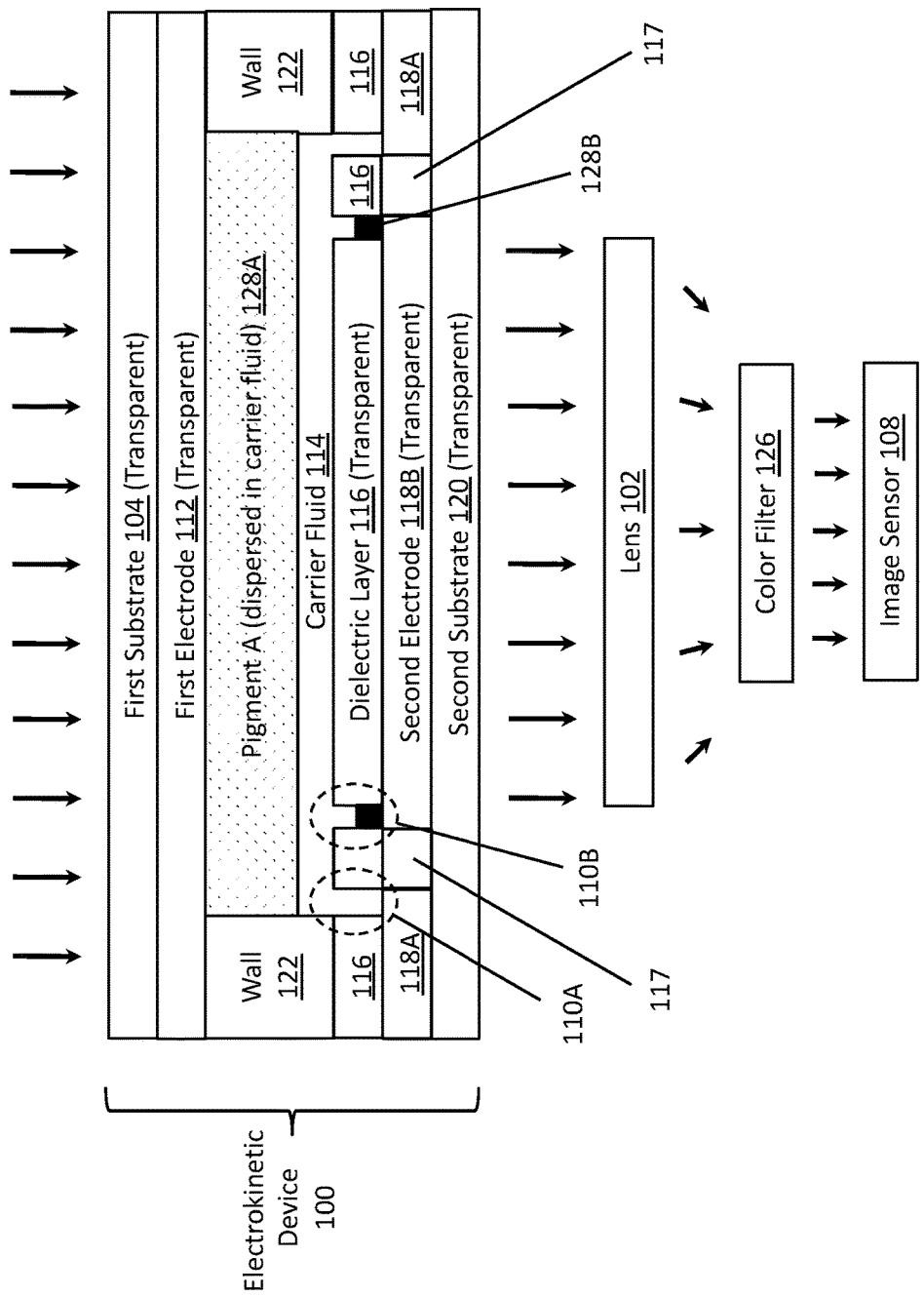

When operating in an IR only mode (or opaque mode), pigment B may be collected in compaction trench 110B while pigment A is dispersed in carrier fluid 114 so as to block the transmission of electromagnetic radiation in the visible range, as shown in FIG. 8. Inner portion 118B of the second electrode may be powered to attract pigment B in compaction trench 110B, while the outer portion 118A of the second electrode may be grounded.

Figure 9:
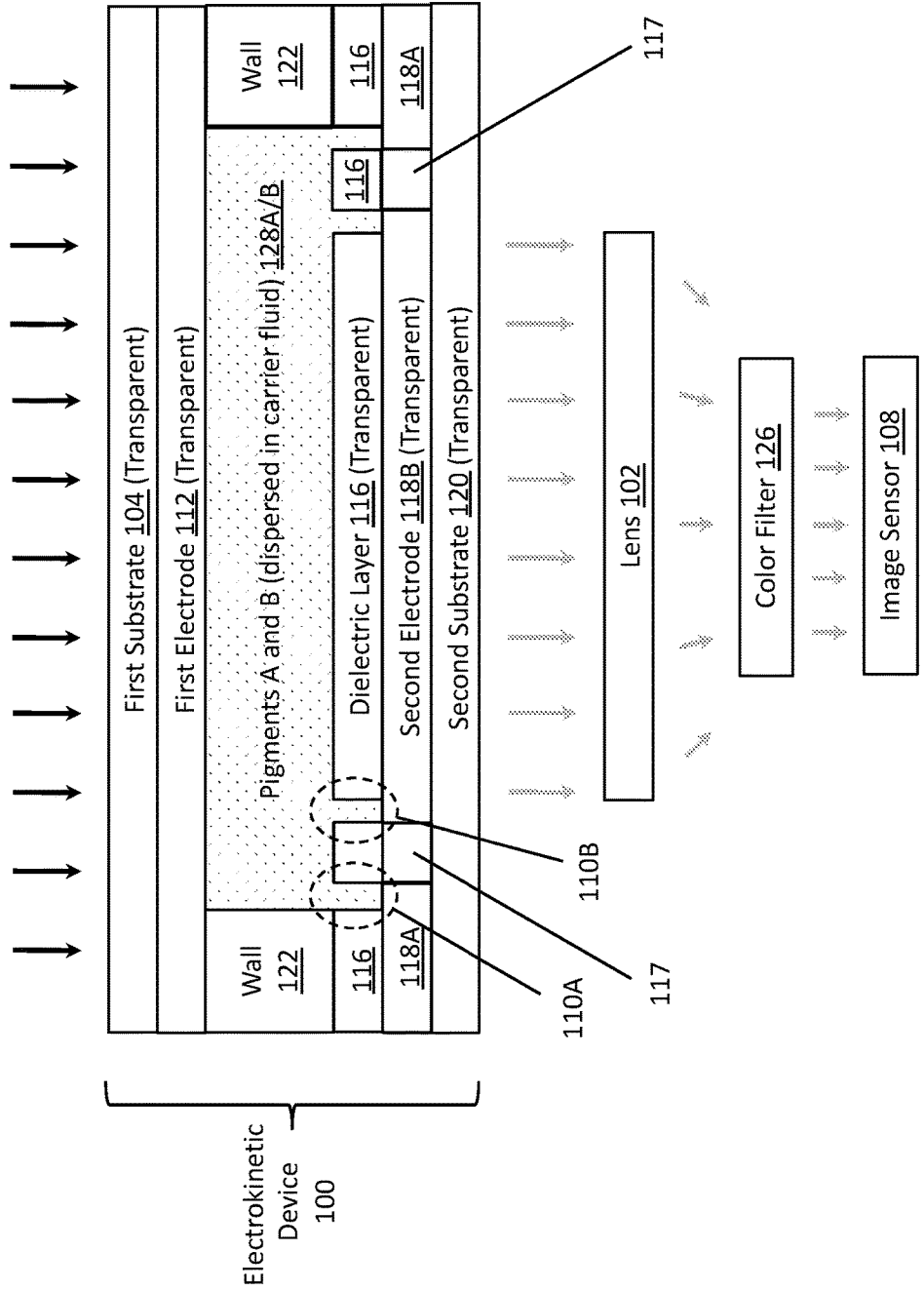

When operating in an opaque mode, pigments A and B may both be dispersed in carrier fluid 114 so as to block the transmission of electromagnetic radiation in both the IR and visible ranges, as shown in FIG. 9. Both the inner and outer portions of the second electrode may be grounded so that neither type of the charged pigments are attracted to the collection channels 110A/B.

FIGS. 10A-10B and 11-13 describe an alternative embodiment of the EK device with an annular phased array pigment pump. The annular phased array pigment pump includes a patterned electrode design including nested concentric rings to move charged pigment particles from a central region of the carrier fluid toward an outer region. Such an EK device has applicability in imaging or other optical systems that have a circular optical path with a diameter larger than 100 micrometers, particularly diameters from 1-5 mm, typical of a small camera module.

Figures 10A, 10B:
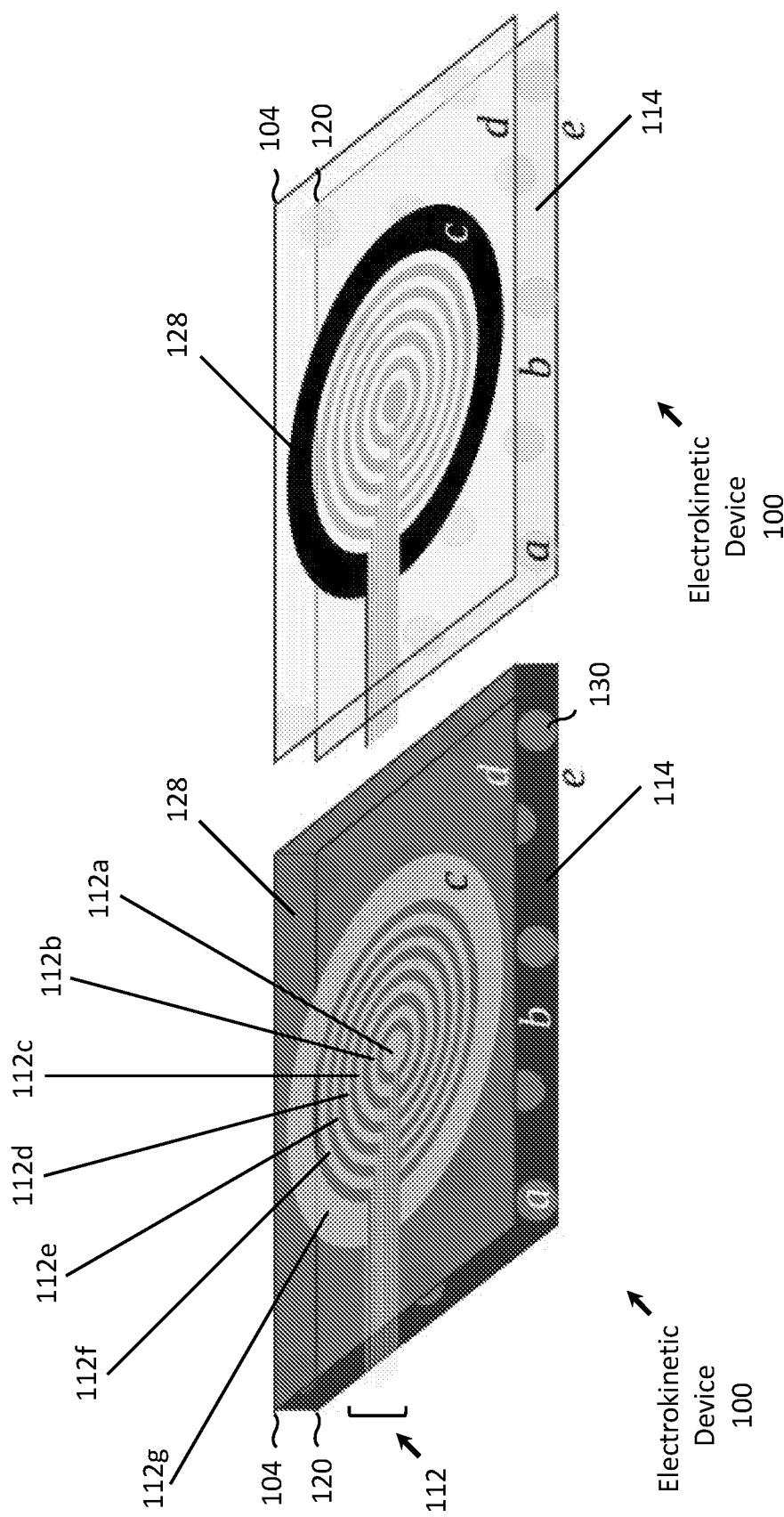
FIGS. 10A and 10B depict perspective views of an EK device with a patterned transparent electrode bearing a central electrode and a series of concentric annular rings surrounding the central electrode, in accordance with another embodiment of the present invention.

FIG. 10A depicts a perspective view of EK device 100 with patterned first electrode 112 that includes a central electrode 112a and a plurality of concentric annular rings 112b, 112b, 112c, 112d, 112e, 112f, and 112g surrounding the central electrode 112a. The central electrode and concentric annular rings may be electrically isolated from one another and individually connected to one or more device drivers (elt. 204 in FIG. 14). The patterned first electrode may be attached to the bottom surface of first substrate 104, and be composed of a transparent material, similar to first electrode 112 described above. A second electrode (not depicted) may be attached to a top surface of second substrate 120. The second electrode may be composed of a transparent material, similar to second electrode 118 described above. Carrier fluid 114 may be contained in the space between first substrate 104 and second substrate 120. Transparent spacer beads 130 (e.g., glass, PMMA, etc.) may be disposed between first substrate 104 and second substrate 120 so as to maintain a defined spacing between the first substrate 104 and second substrate 120.

In FIG. 10A, patterned first electrode 112a-112g and the second electrode (not depicted) are not powered (e.g., prior to operation of the EK device), causing pigments 128 to be uniformly dispersed in carrier fluid 114. In FIG. 10B, annular ring 112g (also called a "storage ring") is held at a constant positive potential with respect to the grounded second electrode (or constant potential opposite to that of the charged pigments), causing pigments 128 to aggregate in the proximity of storage ring 112g. FIG. 10B illustrates EK device 100 operated in the clear state, allowing electromagnetic radiation to pass through the optical path surrounded by pigments 128. It is noted that the width of the storage ring 112g (i.e., width referring to the difference between the radius of the outer boundary of the annulus minus the radius of the annular central opening) may be larger than the width of the other concentric annular rings.

To facilitate the lateral motion of the pigments, electrical waveforms may be applied to each of the central electrode 112a and the concentric annular rings 112b-f. More specifically, a controller (elt. 208 in FIG. 14) can control the one or more device drivers (elt. 204 in FIG. 14) to deliver a zero, positive or negative voltage to each of the central electrode 112a and the concentric annular rings 112b-f. By alternating the voltages between one or more adjacent rings, pulses of pigment can be drawn steadily outward from the central electrode 112a towards storage ring 112g in a multi-step sequence, creating a radial peristaltic pumping action. As one pulse of pigment moves outward, another can begin, and with each outward pulse, the pigment volume located within the optical path becomes incrementally clearer of pigment. The reverse sequence of electrical potentials can be applied to the central electrode 112a and the concentric annular rings 112b-f to draw pigment towards central electrode 112a from the storage ring 112g so as to arrive at the opaque state (not depicted).

Figure 11:
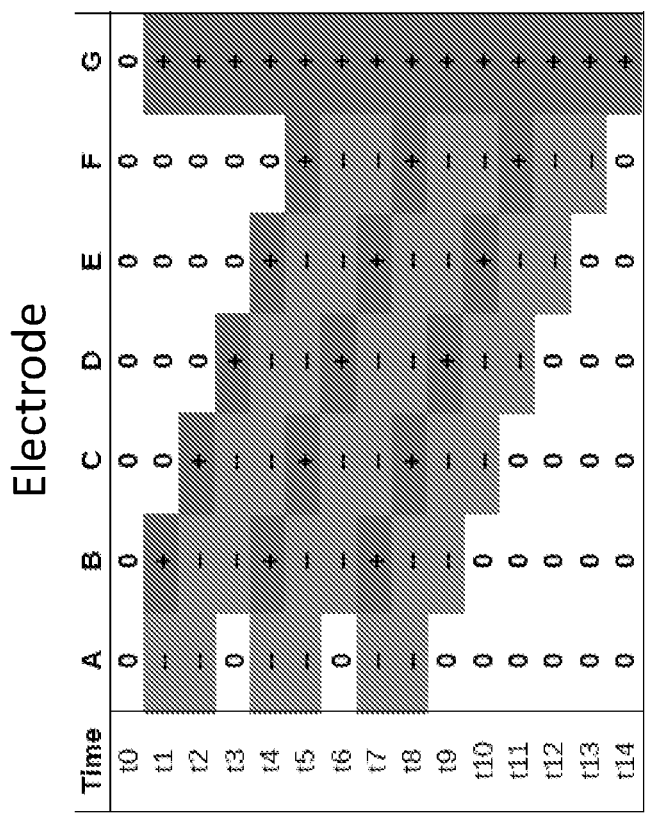
FIG. 11 depicts an overview of voltage waveforms that may be applied to each of the portions of the patterned transparent electrode so as to draw the pigments towards the outer "storage" ring, in accordance with another embodiment of the present invention.
Figure 11:
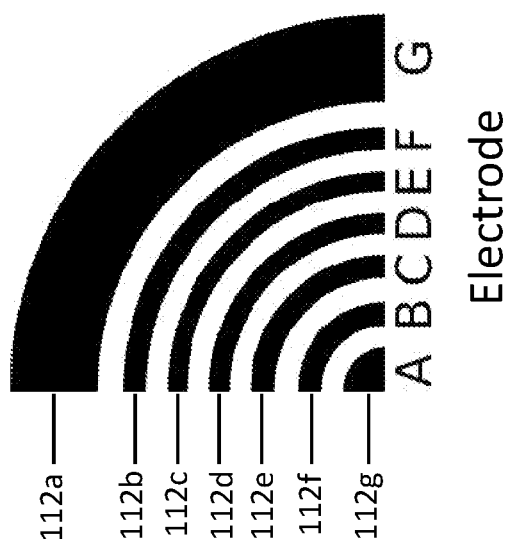

FIG. 11 describes the electrical waveforms in more detail. The left portion of FIG. 11 depicts a portion of the first patterned electrode for easy reference, and the right portion of FIG. 11 depicts a table providing a high-level description of the respective waveforms delivered to each portion of the first patterned electrode. Each column of the table records a 13-step sequence of potentials delivered to each portion of the first patterned electrode. For example, the first column describes a zero-potential delivered to central electrode 112a at time t0, a negative potential delivered to central electrode 112a at time t1, and so on. Of course, the number of steps in the sequence is exemplary, and the exact number of steps may vary in other embodiments. In the example of FIG. 11, the 13-step sequence clears the region under the first patterned electrode in three "ripples" or "pulses".

Initially, at time t0, zero potential may be present on all annular rings and the central electrode both with respect to one another and with respect to the second electrode (not depicted) adjacent to second substrate 120. At time t1, storage ring 112g may be made positive to attract the negatively charged pigment. Also, at time t1, central electrode 112a may be made negative, which repels the negatively charged pigment from the center, and adjacent annular ring 112b may be made positive, to attract the pigment leaving the central electrode 112a. The next step at time t2 continues to repel the pigment from the center, but "slides over" the pigment (formerly attracted to annular ring 112b) to annular ring 112c, by now making annular ring 112c positive and annular ring 112b negative. Next at time t3, the pigment continues to radially move outwards in the lateral direction, while the central electrode 112a is set to zero potential. As zero is more positive than the negative potential on annular ring 112b, some remaining pigment not transported in the outward pulse presently at annular ring 112d will collect at the central electrode 112a. At time t4, this leftover pigment is once again repelled by a negative potential on the central electrode 112a and collects at annular ring 112b, which once again has a positive potential, starting a second pulse which will follow the first outward pulse toward storage ring 112g. By time t13, all three pulses have rippled outward, to be followed by the zero potential of the EK device's idle state, and finally at time t14, only storage ring 112g is energized, and it holds substantially all the pigment, formerly in the central area, in a compressed ring-shaped region directly adjacent to the storage ring 112g.

Figure 12:
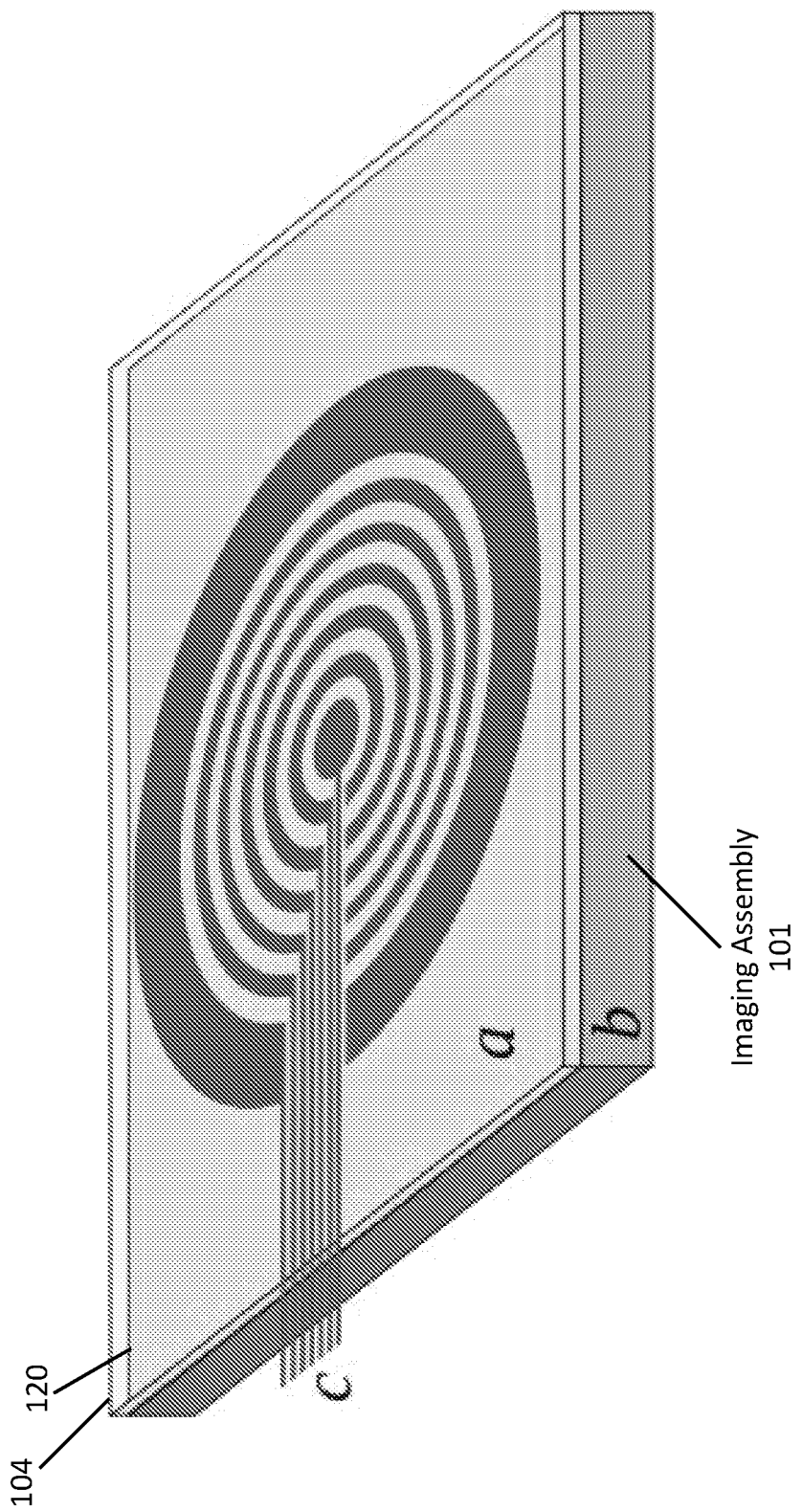
FIG. 12 depicts a perspective view of the EK device of FIG. 9 disposed adjacent to an imaging assembly, in accordance with another embodiment of the present invention.

FIG. 12 depicts a perspective view of the EK device of FIG. 9 positioned adjacent to imaging assembly 101. The EK device 100 (which may also be called an optical modulating film) may include pigment dispersed in a carrier fluid, spacer beads, and two barrier layers with transparent conductive inner surfaces, one of which is patterned as described in FIG. 9. Imaging assembly 101 may be a monolithic imager device, including a CMOS imager IC, a CCD imager IC or a complete miniature camera module. Electrical connections for the first patterned electrode may be electrically coupled to a controller, either external to or internal to imaging assembly 101.

Figure 13:
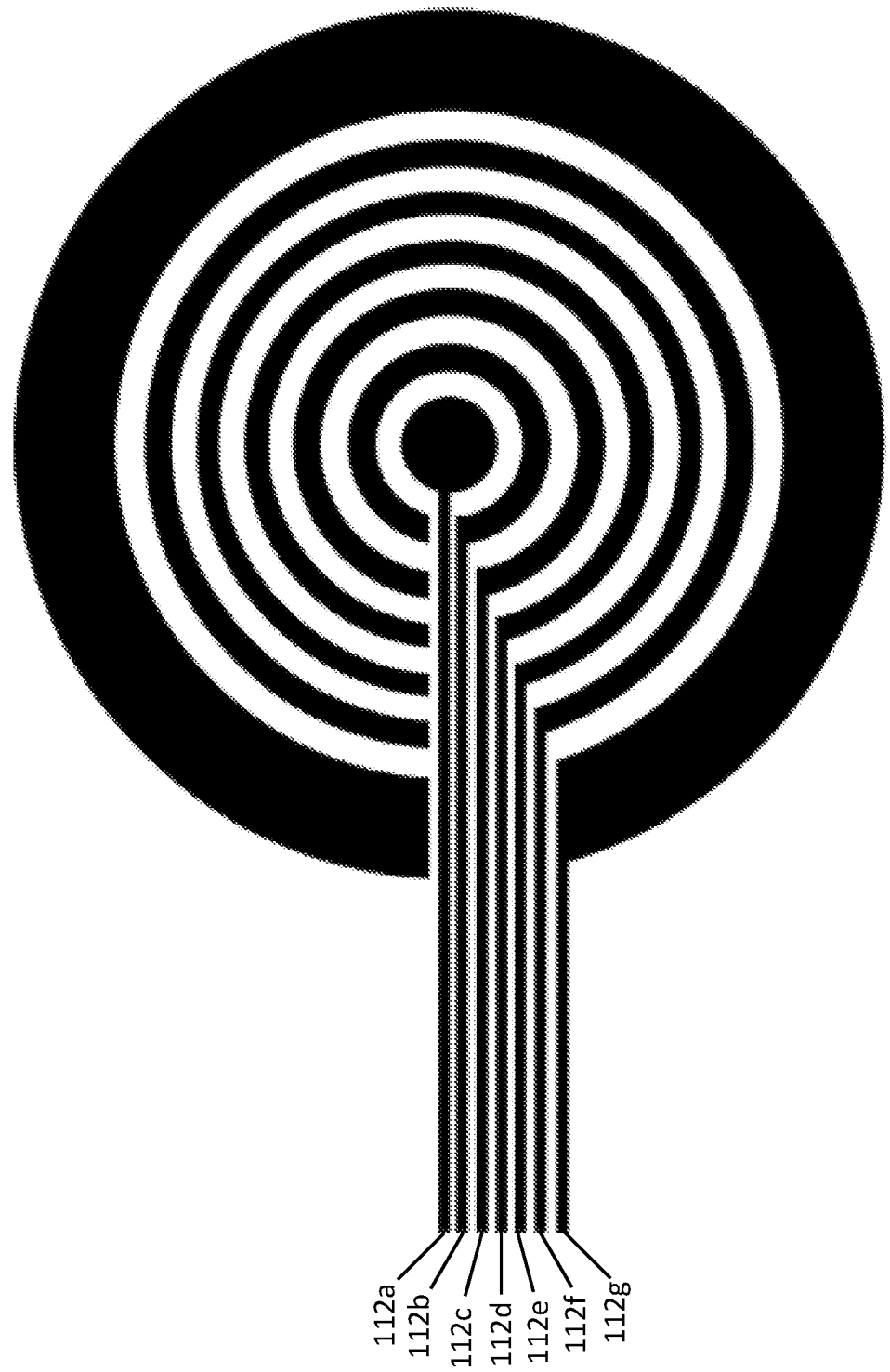
FIG. 13 depicts a top view of the patterned transparent electrode of FIG. 9 in greater detail, in accordance with another embodiment of the present invention.

FIG. 13 depicts a top view of the patterned transparent electrode of FIG. 9 in greater detail. It is understood that the five "pump rings", storage ring and the central electrode depicted in FIG. 13 have not be drawn to scale. In particular, it is noted that the width of the connecting traces with respect to the width of the rings have been exaggerated for clarity. Also, it is understood that the number of pump rings (i.e., five) is exemplary, and a greater or fewer number of pump rings may be employed in practice.

Figure 14:
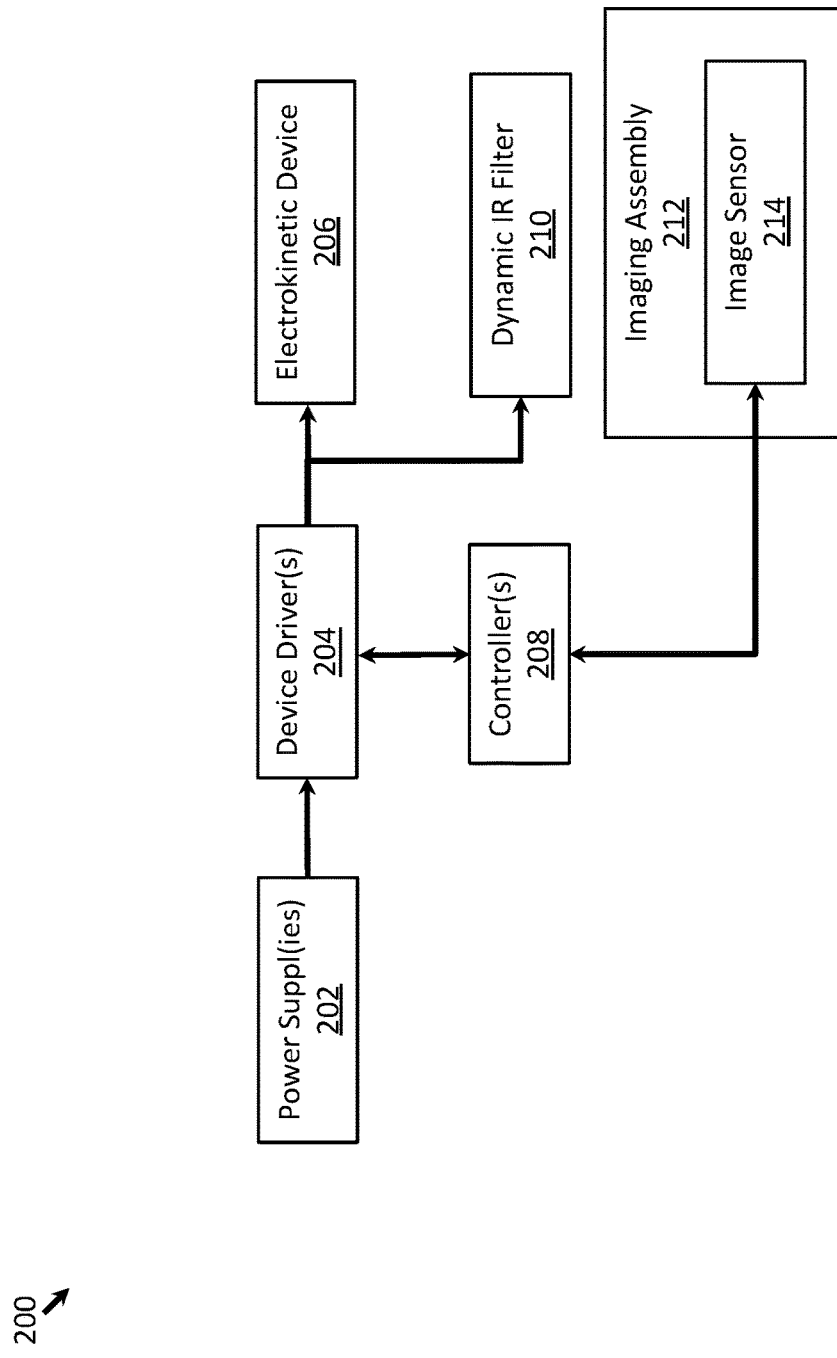
FIG. 14 depicts a system diagram of the components that may be present in various embodiments of the present invention.

FIG. 14 depicts system diagram 200 of the components that may be present in various embodiments of the present invention. EK device 206 and dynamic IR filter 210 may be driven by electrical waveforms that are generated by one or more device drivers 204. In turn, device driver 204 may be powered by power supply 202. Controller 208 may control the operation of one or more device drivers 204 as well as receive image data from image sensor 214 of imaging assembly 212.

Figure 15:
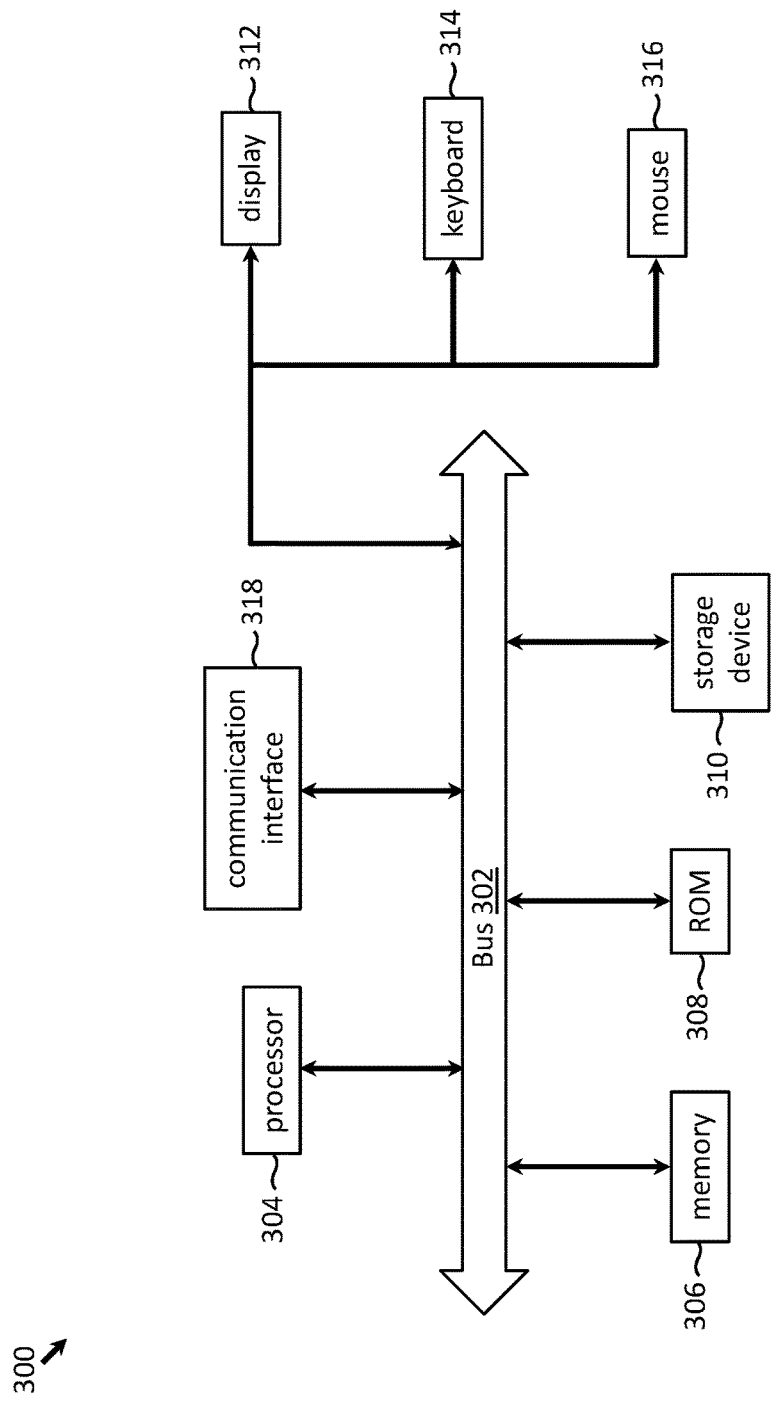
FIG. 15 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 15 provides an example of a system 300 that may be representative of any of the computing systems (e.g., controller 208) discussed herein. Examples of system 300 may include a smartphone, a desktop, a laptop, a mainframe computer, an embedded system, etc., or a portion thereof. Note, not all of the various computer systems have all of the features of system 300. For example, certain ones of the computer systems discussed above may not include a display inasmuch as the display function may be provided by a client computer communicatively coupled to the computer system or a display function may be unnecessary. Such details are not critical to the present invention.

System 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, for example a hard disk, flash memory-based storage medium, or other storage medium from which processor 304 can read, is provided and coupled to the bus 302 for storing information and instructions (e.g., operating systems, applications programs and the like).

Computer system 300 may be coupled via the bus 302 to a display 312, such as a flat panel display, for displaying information to a computer user. An input device 314, such as a keyboard including alphanumeric and other keys, may be coupled to the bus 302 for communicating information and command selections to the processor 304. Another type of user input device is cursor control device 316, such as a mouse, a trackpad, or similar input device for communicating direction information and command selections to processor 304 and for controlling cursor movement on the display 312. Other user interface devices, such as microphones, speakers, etc. are not shown in detail but may be involved with the receipt of user input and/or presentation of output.

The processes referred to herein may be implemented by processor 304 executing appropriate sequences of computer-readable instructions contained in main memory 306. Such instructions may be read into main memory 306 from another computer-readable medium, such as storage device 310, and execution of the sequences of instructions contained in the main memory 306 causes the processor 304 to perform the associated actions. In alternative embodiments, hard-wired circuitry or firmware-controlled processing units may be used in place of or in combination with processor 304 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 300 or similar electronic computing device, that manipulates and transforms data represented as physical (electronic) quantities within its registers and memories into other data similarly represented as physical quantities within its memories or registers or other such information storage, transmission or display devices.

Computer system 300 also includes a communication interface 318 coupled to the bus 302. Communication interface 318 may provide a two-way data communication channel with a computer network, which provides connectivity to and among the various computer systems discussed above. For example, communication interface 318 may be a local area network (LAN) card to provide a data communication connection to a compatible LAN, which itself is communicatively coupled to the Internet through one or more Internet service provider networks. The precise details of such communication paths are not critical to the present invention. What is important is that computer system 300 can send and receive messages and data through the communication interface 318 and in that way communicate with hosts accessible via the Internet. It is noted that the components of system 300 may be located in a single device or located in a plurality of physically and/or geographically distributed devices.

Thus, applications of an electrokinetic device for an imaging system have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A mobile device, comprising an imaging assembly having a lens that directs light to an imaging sensor, and an electrokinetic device fitted as a dynamic lens cover and configured to allow electromagnetic radiation to pass through the lens of the imaging assembly when the dynamic lens cover is in a first operating state and to prevent electromagnetic radiation from reaching the lens of the imaging assembly, a compaction surrounding the imaging assembly for suspending pigment within a carrier fluid between the transparent first and second substrate when the dynamic lens cover is in a first operating state, and wherein the dynamic lens cover is configurable to operate in at least the first operating state or a second operating state.

2. The mobile device of claim 1, wherein the mobile device is a mobile phone.

3. The mobile device of claim 1, wherein the mobile device is one of a laptop, a touchpad, a monitor, a webcam, or a camera.

4. The mobile device of claim 1, wherein the dynamic lens cover, when in the second operating state, is a same color as a case within which the mobile device is included.

5. The mobile device of claim 1, wherein the dynamic lens cover, when in the second operating state, is configurable to be matched to a color of a case within which the mobile device is included.

6. The mobile device of claim 1, wherein the dynamic lens cover is configurable to operate in other operating states in addition to the first and second operating states.

7. The mobile device of claim 1, wherein the electrokinetic device is configured to operate as a dynamic filter to filter out specific wavelengths of light.

8. The mobile device of claim 1, wherein the dynamic lens cover is configurable to operate in the first operating state whenever the imaging assembly is recording images, and to operate in the second operating state under all other circumstances.

9. The mobile device of claim 1, wherein the dynamic lens cover is configurable to operate in the first operating state or the second operating state according to manual control via a user interface of the mobile device.

10. The mobile device of claim 1, wherein the dynamic lens cover is operable to block 90% or more of visible light from reaching the lens of the imaging device when in the second operating state.

11. The mobile device of claim 1, wherein the dynamic lens cover is operable to allow 85% or more of visible light to reach the lens of the imaging device when in the first operating state.

12. The mobile device of claim 1, wherein the dynamic lens cover is operable to switch from the first operating state to the second operating state within 100-1000 msec.

13. The mobile device of claim 1, wherein the dynamic lens cover is operable to switch from the second operating state to the first operating state within 100-1000 msec.

14. The mobile device of claim 1, wherein the dynamic lens cover is sized so as to be operable to block light for lens sizes between 0.01 to 10 mm diameter.

15. The mobile device of claim 1, wherein the compaction trench is shaped to match an outline of the image sensor.

16. The mobile device of claim 1, wherein the electrokinetic device includes transparent first and second substrates, and a plurality of compaction trenchs surrounding the lens of the imaging assembly, each respective compaction trench for storing a respective pigment when the dynamic lens cover is in the first operating state, said respective pigments suspended within a carrier fluid between the first and second substrates.

17. The mobile device of claim 1, wherein the electrokinetic device includes transparent first and second substrates, a compaction trench for storing pigment when the dynamic lens cover is in the first operating state, said pigment suspended within a carrier fluid between the first and second substrates, and a plurality of concentric annual electrodes between the first and second substrates.

18. A method of operating an imaging assembly of a mobile device, comprising configuring an electrokinetic device fitted as a dynamic lens cover for a lens of said imaging device to operate in a first operating state that allows electromagnetic radiation to pass through the lens of the imaging assembly to an imaging sensor, a compaction trench surrounding the imaging assembly for suspending pigment within a carrier fluid between the transparent first and second substrate when the dynamic lens cover is in a first operating state, and, subsequently configuring the electrokinetic device to operate in a second operating state to prevent electromagnetic radiation from reaching the lens of the imaging assembly.

* * * * *